United States Patent Office 3,178,310
Patented Apr. 13, 1965

3,178,310
AQUEOUS POLYURETHANE COATING EMULSIONS
Robert L. Berger, Elmhurst, Ill., and Mortimer A. Youker, Wilmington, Del., assignors to E. I. du Pont de Nemours and Company, Wilmington, Del., a corporation of Delaware
No Drawing. Filed Mar. 1, 1962, Ser. No. 176,818
12 Claims. (Cl. 117—142)

This invention relates to novel pocesses for improving the physical properties of paper and of leather and more particularly to processes involving the treatment of paper and of leather with an aqueous emulsion of a polyurethane polymer.

For many applications, particularly as a masking tape base, the physical properties of conventional paper leave something to be desired. For example, the tensile strength of wet paper needs to be increased and the ply adhesion of dry paper should be improved. Also, the physical properties of conventional tanned leather should be enhanced, for example, the resistance to wrinkle formation, known in the trade as "break"; the scuff resistance; and the abrasion resistance.

It is known that the physical properties of paper which has been treated with a rubber latex are improved by impregnating it afterward with a solution of an isocyanate. Unfortunately, this approach is not entirely convenient. Conventional paper would have to be treated with a rubber latex by an additional step before the isocyanate treatment could be started. The use of isocyanate solutions would require new financial investment by the trade which is presently adapted to operating with aqueous latices, and the vapor of monomeric polyisocyanates (such as toluene diisocyanate) would present hazards necessitating special operating precautions. It would, therefore, be desirable to have a simpler and more convenient process.

It is an object of the present invention to provide processes for treating paper and leather to improve their physical properties. A further object is to provide processes for treating paper and leather involving the use of aqueous emulsions of a polyurethane polymer. Other objects will appear hereinafter.

These and other objects of this invention are accomplished by a process for treating unsized paper which comprises contacting the paper with an aqueous emulsion containing a polyurethane polymer so as to impregnate said paper with from about 5 to about 150 percent of its weight with said polyurethane polymer, drying said impregnated paper and curing said polyurethane polymer; said aqueous emulsion being prepared by emulsifying a fluid isocyanate-terminated polyurethane polymer in an aqueous medium at temperatures between 20° C. and 95°C. with agitation in the presence of a water-soluble organic emulsifying agent of the type which will give an oil-in-water emulsion; said emulsion being applied to the paper at temperatures between 20° and 95° C. within 24 hours of its preparation; said isocyanate-terminated polyurethane polymer being the reaction product of (1) a molar excess of an aromatic polyisocyanate and (2) an organic polyol selected from the group consisting of at least one hydroxyl-terminated organic polymer having a molecular weight between about 750 and about 4000 and mixtures of said organic polymer with up to about 20 percent by weight of said polymer of at last one aliphatic polyol having a molecular weight between 62 and about 350, said aliphatic polyol having $n$ hydroxyl groups, wherein $n$ is an integer having a value of at least 2 with $n-2$ of said hydroxyl groups being cross-linking hydroxyl groups; the relative proportions of said aromatic polyisocyanate and said organic polyol being selected so that the ratio of the number of free isocyanate groups to the total number of hydroxyl groups has a value ranging between about 1.2 and about 2.0; there being an average of no more than about one cross-linking hydroxyl group for each 1200 molecular weight units of said isocyanate-terminated polyurethane polymer; said organic polymer being selected from the group consisting of polyalkyleneether glycols, polyalkyleneether-aryleneether glycols, polyalkyleneether-thioether glycols, polyalkylenearyleneether-thioether glycols, polyester polyols, fatty acid triglycerides having a hydroxyl number of at least 49, and reaction products of alkylene oxides with hydrocarbon polyols, said alkylene oxides having molecular weights between about 44 and about 250, said hydrocarbon polyols having molecular weights between about 62 and 350. These objects are also accomplished by a process for treating tanned leather which comprises contacting one side of a section of leather with an aqueous emulsion containing a polyurethane polymer as described above so as to impregnate partially the leather with from about 1 gram to 10 grams of the polyurethane polymer per square foot of said leather, drying said impregnated leather, and curing said polyurethane polymer within the leather.

The paper which is impregnated by the present process is unsized paper or "waterleaf" paper, as it is often referred to by the trade; that is, the paper has not been treated by incorporation of agents, such as rosin, hydrocarbon and natural waxes, starches, sodium silicate, glue, casein, synthetic resins, or latices of synthetic rubber or natural rubber, to render it water-repellent and water-impermeable, The types of unsized paper which can be used include unbleached ground wood type, unbleached sulfite type, semi-bleached sulfite type, bleached sulfite type, neutral sulfite type, unbleached sulfate type, semi-bleached sulfate type, which is preferred (such as bags, bristols, envelope paper, milk-bottle board, masking tape base, fruit tissues, toweling), bleached sulfate, known as bleached kraft, soda pulp type and semi-chemical pulp type. This process can be employed in application to papers which are based wholly or in part on synthetic fiber materials. A representative example of such paper is described in Belgian Patent 564,026. It is to be understood that the term "paper" as used herein shall include not only dry sheeting but also the "wet web" stock newly formed in a paper-making machine (such as the Fourdrinier device). The term "paper" shall also encompass chemically processed pulp, called "furnish" by the trade, which is at least ready for addition to the beater (or Hollander) for eventual introduction into a paper-making machine; the polyurethane polymer latex is added to the "furnish" by conventional means, preferably after the beating operation is at least partially completed.

The leather which is impregnated by the present process is any unfinished tanned leather used by the trade (preferably having a tensile strength at 25° C. of at least 2000 p.s.i.). Thus it may be applied to any of the leather used for shoe linings, soles, and uppers, welting, belting, harness, gloves and garments, upholstery, bookbinding, straps, cases, bags, collars, and laces made from cattle hides, calf and kip skins, goat and kid skins, sheep and lamb skins, horse hides, pig skins, alligator skins and the like. It is to be understood that the leather prior to tanning has undergone the conventional processes such as reconditioning, scouring, liming, dehairing, trimming, fleshing, deliming, bating, scudding, pickling, degreasing, and the like. It is also to be understood that the tanning, that is the conversion of a beamed skin or hide into leather, can be done by any of the procedures familiar to those skilled in the art. The leather can be chrome tanned by such general procedures as the 1-bath or 2-bath processes, vegetable tanned, alum tanned, formaldehyde tanned, oil tanned, combination tanned, and by specialty procedures.

The preceding procedures are more particularly described in the following books: Leather Dressing, Lamb; The Chemistry of Leather Manufacture, McLaughlin and Theis; The Chrome Tanning Process, Merry; Leather Finishes, Mudd; Tanning Processes, Orthman; Principles of Leather Manufacture, Proctor; Practical Tanning, Rogers; Principles and Process of Light Leather Manufacture, Smith; Shoe and Leather Processes, Stockdale; The Chemistry of Leather Manufacture, volumes I and II, Wilson; Modern Practice in Leather Manufacture, Wilson; Analysis of Leather, Wilson and Nerrill; The Puering, Bating and Drenching of Skins, Wood. If the unfinished leather has a grain layer, it is preferred that this layer be buffed or corrected before the aqueous emulsion is applied.

In operating the processes of this invention a high molecular weight isocyanate-terminated polyurethane polymer is prepared by reacting a stoichiometric excess of one or more aromatic polyisocyanates with one or more high molecular weight hydroxyl-terminated polymers, optionally mixed with one or more low molecular weight aliphatic polyols. This reaction product, while in the form of a liquid, is emulsified in water and the emulsion thereby formed is applied, within 24 hours of its preparation, by conventional means to untreated paper or leather. After any excess emulsion has been removed, the impregnated paper or leather is dried and cured. The treated paper thereby obtained exhibits greatly improved tensile strength (particularly when wet) and ply adhesion. Also the properties of the treated leather are enhanced. Appreciably improved properties are exhibited immediately after the drying step and before curing.

The isocyanate-terminated polyurethane polymer which is used to prepare the aqueous emulsion is obtained by reacting a molar excess of an aromatic polyisocyanate with a high molecular weight hydroxyl-terminated polymer and, optionally, a low molecular weight aliphatic polyol under substantially anhydrous conditions. In general, the polyols may be employed as a mixture although it is to be understood that some or all of them may be separately reacted and the products obtained blended to give the desired fluid composition. Agitation is normally used to provide thorough mixing of the reactants and to aid in the temperature control. The reaction is carried out at a temperature between about 25 and 100° C. for a period of from ½ to several hours. In general, it is preferred to carry out the reaction at 80° C. for a period of about 4 hours. It is to be understood that the lower temperatures require longer reaction times and at temperatures higher than about 100° C. a composition of increased viscosity is obtained. If desired, the reaction may be carried out in more than one step. Thus, a hydroxyl-terminated polyurethane may be made by reacting the aromatic polyisocyanate with a molar excess of all of the polyols. This polyurethane in turn may then be reacted with additional aromatic polyisocyanate or isocyanate-terminated polyurethane. In any event, the proportions of reactants used should be selected so that no more than about 20 parts by weight of the low molecular weight polyol is used for every 100 parts by weight of high molecular weight polymer and the value of the ratio of the number of free isocyanate groups to the total number of hydroxyl groups should range from about 1.2:1 to 2.0:1. Furthermore, there should be an average of no more than about one cross-linking hydroxyl group for each 1200 molecular weight units of reactants used to form the isocyanate-terminated polyurethane. Each polyol has $n$ hydroxyl groups where $n$ is an integer having a value of at least 2; $(n-2)$ of these hydroxyl groups are cross-linking hydroxyl units. Glycerine thus has 1 cross-linking group; pentaerythritol has 2.

The isocyanate-terminated polyurethane polymer, at the time it is emulsified in the aqueous medium to form the emulsion, should be in the form of liquid or fluid. In the absence of moisture this isocyanate-terminated polyurethane polymer is indefinitely stable at room temperature. The term fluid, as used herein, means that the composition may be viscous at room temperature but is, nevertheless, capable of being poured even when fully compounded at 95° C. When the isocyanate-terminated polyurethane polymer is too thick or too viscous to emulsify properly in water, it can be diluted with an inert solvent, such as toluene and the resulting solution emulsified in the aqueous medium. It is also possible to heat the isocyanate-terminated polyurethane polymer or its solution to temperatures up to about 95° C. in order to improve fluidity.

As mentioned above, the isocyanate-terminated polyurethane polymer is prepared from a hydroxyl-terminated polymer having a molecular weight of between about 750 and 4000 (or a mixture of the same with a low molecular weight aliphatic polyol having a molecular weight not greater than about 350) and an aromatic polyisocyanate. The useful high molecular weight polymers include polyalkyleneether glycol polyalkylene-aryleneether glycols, polyalkyleneether-thioether glycols, polyalkylene-aryleneether-thioether glycols, polyester polyols, fatty acid triglycerides having a hydroxyl number of at least 49, and reaction products of alkylene oxides with hydrocarbon polyols. Polyalkyleneether glycols are preferred. Mixtures of the high molecular weight polyols may be used when desired. The polyalkyleneether glycols may be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethyleneether glycol. Mixtures of two or more polyalkyleneether glycols may be employed if desired.

The polyalkyleneether-thioether glycols may be represented by the formula $HO(QY)_aH$ wherein Q represents hydrocarbon radicals at least some of which are alkylene, Y represents chalcogen atoms some of which are sulfur and the rest oxygen, and $a$ is an integer sufficiently large so that the molecular weight of the polymer is about 750 to 4000. The following are representative examples:

$HO(CH_2-CH_2-S-CH_2-CH_2-O-CH_2-CH_2-O-)_aH$,
$HO(CH_2-CH_2-S-CH_2-CH_2-O-)_aH$, and
$HO(CH_2CH_2-S-CH_2CH_2CH_2CH_2-S-CH_2CH_2-O-)_aH$ These glycols may be prepared by condensing together various glycols and thiodiglycol in the presence of a catalyst such as p-toluene sulfonic acid.

The polyalkylene-arylene glycols are similar to the polyalkyleneether glycols except that some arylene radicals are present. The phenylene, naphthalene and anthracene radicals may be used with or without substituents such as alkyl or alkylene groups, and, in general there should be at least one alkyleneether radical having a molecular weight of about 500 for each arylene radical which is present. When part of the ether oxygens are replaced with sulfur, a polyalkylene-aryleneether-thioether glycol results, which also may be used in the subject composition.

The polyester polyols may be made by the polymerization of cyclic lactones such as ε-caprolactone or by the condensation polymerization from a dicarboxylic acid and a molar excess of an organic diol. Optionally, a small amount of a higher functional polyol (e.g., trimethylolpropane) may be included. Representative examples of useful diols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy) - 1 - butanol, 5-(2-hydroxypropoxy)-1-pentanol, 1 - (2 - hydroxymethoxy) - 2 - hexanol, 1-(2-hydroxypropoxy)-2-octanol, 3-allyloxy-1,5-pentanediol, 2-[(allyloxy)methyl]-2-methyl-1,3-propanediol, [(4-pentenyloxy)methyl]-1,3-propanediol, 2 - methyl - 2 - [(10-undecenyloxy)methyl]-1,3-propanediol, 3 - (o-propenylphenoxy) - 1,2 - propanediol, thiodiglycol, 2,2'-[thiobis(ethyleneoxy)]-diethanol, and 2,2'-isopropylidenebis(p-phenyleneoxy)diethanol. If desired, mixtures of two or more of these low molecular weight diols may be used. Representative examples of useful higher functional polyols include glycerol, 1,2,6-hexanetriol, 1,1,1-trimethylolpropane, 1,1,1 - trimethylolethane, 3 - (2 - hydroxyethoxy) - 1,2 - propanediol, 3-(2-hydroxypropoxy)-1,2-propanediol, 2,4 - dimethyl - 2 - (2 - hydroxyethoxy)-methylpentanediol - 1,5, 1,1,1 - tris[(2-hydroxyethoxy)methyl]ethane, 1,1,1 - tris[(2-hydroxypropoxy)methyl]propane, triethanolamine, triisopropanolamine, 1,1,1-tris-[(2-hydroxypropoxy)methyl]butane, 5,6-bis(2-hydroxyethoxy)-3,8-dioxa-1,10-decanediol, 8,8 - bis(2 - hydroxyethoxymethyl) - 3,6,10,14 - tetraoxa - 1,15 - pentadecanediol and N,N,N',N' - tetrakis(2-hydroxyethyl)ethylenediamine. If desired, mixtures of two or more of these low molecular weight higher functional polyols can be used. Representative examples of useful dicarboxylic acids are oxalic acid, malonic acid, succinic acid, glutaric acid, adipic acid, pimelic acid, suberic acid, azelaic acid, sebacic acid, fumaric acid, maleic acid, and phthalic acid. Anhydrides of dicarboxylic acids may be employed in place of the acids; succinic anhydride and phthalic anhydride are representative examples. If desired, mixtures of two or more of these dicarboxylic acids and/or anhydrides can be used.

The fatty acid triglycerides should have a hydroxyl number of at least 49. From a practical standpoint, a hydroxyl number of 180 is the usual limit. This value is the hydroxyl number of the pure triglyceride of ricinoleic acid and is not a limitation except from a practical standpoint. Naturally occurring oils with higher hydroxyl numbers are not known, and it is difficult to oxidize unsaturated oils to such an extent that the oxidation product has a hydroxyl number above 180. The useful fatty acid triglycerides may be either a naturally occurring oil such as castor oil or may be a blown drying oil of the type known in the trade as "heavy bodied" oils, such as blown linseed, tung, poppyseed, hempseed, soya oils, and the like. In addition to mixtures of two or more fatty acid triglycerides one can use mixtures of at least one fatty acid triglyceride with at least one polyol selected from the group consisting of epoxidized fatty acid triglycerides, the low molecular weight polyols described hereinafter and higher functional polyols, polyalkyleneether glycols, polyalkyleneether-thioether glycols, polyalkyleneether-aryleneether glycols, polyalkylene-aryleneether-thioether glycols and polyester polyols.

In addition to the above, one may use hydroxyl-terminated organic polymers having molecular weights between about 750 and 4000 which are obtained by reacting one or more alkylene oxides having a molecular weight between about 44 and 250 with one or more low molecular weight hydrocarbon polyols having molecular weights between about 62 and 350. Representative alkylene oxides include ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 1,2-epoxy-5-hexene and 1,2-epoxy-3-butene. In addition to mixtures of these oxides, minor proportions of alkylene oxides having cyclic substituents may be present such as styrene oxide, cyclohexene oxide, 1,2-epoxy-2-cyclohexylpropane, and α-methyl styrene oxide. The hydrocarbon polyols having molecular weights between about 62 and 350 include the compounds listed hereinafter.

As noted above the isocyanate-terminated polyurethane polymer may be prepared by utilizing a low molecular weight aliphatic polyol in conjunction with the high molecular weight hydroxyl-terminated polymer. These polyols should have molecular weights of from about 62 to 350, and when employed may be used in an amount sufficient to provide up to about 20 parts by weight per 100 parts by weight of hydroxyl-terminated polymer.

Representative polyols include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy) - 1 - butanol, 5 - (2 - hydroxypropoxy) -1-pentanol, 1 - (2 - hydroxymethoxy) - 2 - hexanol, 1 - (2-hydroxypropoxy) - 2 - octanol, 3 - allyloxy - 1,5 - pentanediol, 2 - [(allyloxy)methyl] - 2 - methyl - 1,3 - propanediol, [(4-pentenyloxy)methyl]-1,3-propanediol, 2-methyl-2-[(10-undecenyloxy)methyl]-1,3-propanediol, 3-(o-propenylphenoxy)-1,2-propanediol, thiodiglycol, 2,2'-[thiobis(ethyleneoxy)]-diethanol, 2,2'-isopropylidenebis-(p-phenyleneoxy)diethanol, glycerol, 1,2,6-hexanetriol, 1,1,1-trimethylolpropane, 1,1,1-trimethylolethane, 3-(2-hydroxyethoxy)-1,2-propanediol, 3-(2-hydroxypropoxy)-1,2 - propanediol, 2,4-dimethyl - 2 - (2 - hydroxyethoxy)-methylpentanediol - 1,5, 1,1,1 - tris[(2 - hydroxyethoxy)methyl]ethane, 1,1,1 - tris[(2 - hydroxypropoxy)methyl]propane, triethanolamine, triisopropanolamine, 1,1,1-tris-[(2-hydroxypropoxy)methyl]butane, 5,6-bis(2-hydroxyethoxy) - 3,8 - dioxa - 1,10 - decanediol, 8,8 - bis(2 - hydroxyethoxymethyl) - 3,6,10,14 - tetraoxa - 1,15 - pentadecanediol and N,N,N',N'-tetrakis(2-hydroxyethyl)-ethylenediamine. Mixtures of two or more of these polyols may be employed if desired. The polyols listed in this paragraph are those which may be employed for reaction with an alkylene oxide in the preparation of the high molecular weight polymer reactant.

In preparing the isocyanate-terminated polyurethane polymer any of a wide variety of aromatic polyisocyanates may be employed either alone or as isomer mixtures or as mixtures of different polyisocyanates. Arylene diisocyanates in which the two isocyanate groups differ in reactivity are particularly desirable. Examples of useful polyisocyanates include toluene-2,4-diisocyanate, 1,5-naphthalene - diisocyanate, cumene - 2,4 - diisocyanate, 4 - methoxy - 1,3 - phenylenediisocyanate, 4 - chloro - 1,3-phenylenediisocyanate, 4 - bromo - 1,3 - phenylenediisocyanate, 4-ethoxy-1,3-phenylenediisocyanate, 2,4'-diisocyanatodiphenylether, 5,6 - dimethyl - 1,3 - phenylenediisocyanate, 2,4-dimethyl-1,3-phenylenediisocyanate, 4,4'-diisocyanatodiphenylether, benzidinediisocyanate, 4,6-dimethyl - 1,3 - phenylenediisocyanate, 9,10 - anthracenediisocyanate, 4,4'-diisocyanatodibenzyl, 3,3'-dimethyl-4,4'-diisocyanatodiphenylmethane, 2,6 - dimethyl - 4,4' - diisocyanatodiphenyl, 2,4-diisocyanatostilbene, 3,3'-dimethyl-4,4' - diisocyanatodiphenyl, 3,3' - dimethoxy - 4,4' - diisocyanatodiphenyl, 1,4-anthracenediisocyanate, 2,5-fluorenediisocyanate, 1,8-naphthalenediisocyanate, 2,6-diisocyanatobenzfuran, and 2,4,6-toluenetriisocyanate.

The aqueous emulsion which is used to treat the paper and leather is prepared by emulsifying the fluid isocyanate-terminated polyurethane polymer in an aqueous medium in the presence of a water-soluble organic emulsifying agent. The amount of water employed in the formation of the emulsion is not critical, although in general the minimum amount will be equal to the volume of the isocyanate-terminated polyurethane polymer or the solvent solution or slurry of this polymer. When insufficient water is employed, emulsions are obtained which are too thick to handle readily. On the other hand, dispersions which are too dilute supply an insufficient amount of polymer to impregnate the paper or the leather satisfactorily in a convenient single application. Emulsions containing about 20 to 35 percent solids content are preferred.

The emulsifying agent may be added either to the isocyanate-terminated polyurethane polymer or to the water in which the polymer is to be emulsified, or it may be formed in situ during addition of the isocyanate-terminated polyurethane polymer to the water. Agitation should be provided during the emulsification and for this purpose colloidal mills or other devices familiar to those skilled in the art may be used. Any water-soluble organic emulsifying agent which will give oil-in-water emulsions is satisfactory for use in the present invention; the non-ionic, anionic, and cationic types are included here. Mixtures of agents may be employed when desired. Non-ionic agents such as mono-(and di-)long chain alkyl ethers of polyethyleneether glycol are particularly useful. Anionic surface active agents can be used such as sodium salts of long-chain alkyl substituted aryl sulfonic acids, or of long-chain alkyl sulfonic acids, or of high molecular weight carboxylic acids. Further representative examples are the tertiary amine or alkylol amine salts of long-chain alkyl acid sulfate esters, alkyl sulfonic acids, or alkyl aryl sulfonic acids; and the disodium sulfates of alkylated naphthalene-formaldehyde condensation products. Cationic surface active agents, such as quaternary ammonium salts containing at least one large alkyl group (e.g., dimethyl-ethyloctadecyl ammonium bromide), comprise still another class of emulsifying agents which can be employed. Amine soaps and alkali metal hydroxides may also be used. Salts of the high molecular organic acids, such as tall oil and rosin, are conveniently incorporated by mixing the acid with the isocyanate-terminated polyurethane polymer and having the requisite amount of alkali present in the aqueous bath so as to form the emulsifier in situ.

The terminology "oil-in-water" emulsifying agents is well understood by those skilled in the art and is set out in detail in the book "Surface Active Agents," Schwartz and Perry, Interscience Publishers, Inc. (1949), pp. 342–345, particularly p. 344. Pages 202–206 of Schwartz and Perry, supra, describe suitable non-ionic water-soluble oil-in-water emulsifying agents. Emulsifiers A and C of the examples below are of this type. Anionic surface active agents are set out broadly on pp. 9–12 of Schwartz and Perry, supra. Emulsifier D of the examples below is an example of an anionic water-soluble oil-in-water emulsifying agent particularly described on pp. 11 and 54 of Schwartz and Perry, supra. Emulsifier B of the examples below is an example of a type of anionic water-soluble oil-in-water emulsifying agent described on pp. 116–120, particularly p. 119, of Schwartz and Perry, supra. Further descriptions of oil-in-water emulsifying agents may be found on page 148 of Clayton's "The Theory of Emulsions and Their Technical Treatment," Fifth Edition, by C. G. Cumner, the Blakiston Co., N.Y., 1954; pages 26, 30, 96, and 103 of "Emulsions and Foams," Berkman and Egloff, Reinhold Publishing Co., N.Y., 1941; and page 158 of "Surface Activity," Moilliet and Collie, D. Van Nostrand, N.Y., 1951.

From 2 percent to 5 percent of the emulsifying agent based on the weight of the water employed in the formation of the latex will usually be sufficient to produce stable emulsions. When a fatty acid soap is used as the emulsifying agent, care must be taken that the soap is not destroyed by acidic substances. The pH should be maintained at least as high as that of an aqueous solution of the soap if stable latices are desired. For most fatty acid soaps the pH should be at least 9. It should be noted that the carbon dioxide formed by the chain-extension of the isocyanate groups with water is acidic and uses up free alkali in the emulsion, so that an excess of alkali should be used to compensate for this.

It is important that the aqueous emulsion used in the process of the invention be used within 24 hours and preferably within 8 hours of its preparations. The isocyanate-terminated polyurethane polymer which is emulsified in the aqueous medium can chain extend by reacting with the water in the emulsion. Thus, while the emulsion is physically stable for an indefinite period of time at temperatures between about 20° and 95° C., its chemical composition can change. It has been found that much less improvement is obtained by impregnating paper and leather with an emulsion which has been allowed to age for more than a day at 20° C. It is to be understood that the temperature at which the emulsion is aged, after it is prepared, will determine the time when the emulsion must be used. Thus, if the emulsion is kept at about 20° to 35° C., it may be used at any time within 24 hours of its preparation. If kept at 45° C. or 55° C. it should be used within 12 hours or 6 hours respectively. If kept at 95° C., it should be used within 15 to 30 minutes of its preparation. It is apparent that as the temperature increases the time when the emulsion must be used will decrease. The temperature of the emulsion may vary from 20° to 95° C. during the time it is prepared and used. Whenever possible, it is preferred to prepare and use the emulsion at about 20° to 25° C.

The aqueous emulsion can be used to impregnate sheets of paper or sides of leather by any of the well-known techniques. When using paper, the paper can be immersed in an emulsion bath and the excess emulsion later removed by blotting the impregnated paper, by passing it between the nip of a pair of squeeze rolls, by applying suction, or by blowing with air. One can spray the paper with emulsion. One can also pass the paper between the nip of a pair of coating rolls. The degree of emulsion pickup will be governed by such factors as the porosity of the paper, the solids content of the emulsion, in particular the concentration of the isocyanate-terminated polyurethane polymer in the emulsion, and the effectiveness of the process used to remove the excess emulsion from the paper (e.g., pressure exerted by the squeeze rolls or the suction applied to the paper). Thus the amount of emulsion retained can be varied by those skilled in the art by trial and error procedures in which the effect of changes in one or more process conditions is studied.

After the paper has become impregnated it is dried and cured. Drying is often conveniently accomplished by placing the paper in a 100° C. oven for about 10 to 30 minutes. Higher and lower temperatures can be used, if desired. At lower temperatures the drying time may be inconveniently long. At temperatures much above 150° C. there is a possibility of degrading the polyurethane polymer.

100 parts by weight of paper can be impregnated with about 5 to 150 parts by weight of the polyurethane polymer. The amount needed for optimum results will depend upon the nature of the paper, the polyurethane polymer, and the application intended for the impregnated paper. The proper choice can be readily determined by those skilled in the art. In general, although paper is improved by impregnation with less than 5 parts of polyurethane polymer, there is usually not enough gained to provide economic justification for operating the process. It is difficult to introduce more than 150 parts of polyurethane polymer conveniently. Furthermore, paper impregnated with less than 150 parts of polyurethane polymer is sufficiently improved so that there is no economic incentive to use more polyurethane.

One can use the impregnated paper as soon as it has been dried. However, one can attain an even better grade of paper by first curing it. A convenient procedure consists in keeping the paper at room temperature and 50 percent relative humidity for about 1 to 7 days. Other conditions of temperature, humidity, and time may be used within the skill of the art. Higher temperatures and greater relative humidity will accelerate the cure; otherwise the polyurethane polymer will cure under normal ambient storage conditions.

When using leather which has a grain it is preferred to impregnate the grain side of the leather. By grain side is meant the side originally having the outer surface layer called the epidermis. The epidermis is generally not desired in leather and is removed during the processing. When stock having no grain (split leather) is used, either side may be treated with the emulsion of polyurethane polymer. Both sides, however, are not treated. Contacting both sides of the leather with the polyurethane stiffens it and gives it a bad "break." Total impregnation should be avoided for the same reason.

The leather can be treated by conventional techniques such as roller coating, brushing, swabbing, spraying, and the like. It is preferred to apply an amount of emulsion that can be retained by the leather. Any excess emulsion, however, can be removed by swabbing or blotting the leather, by passing the leather between the nip of a pair of squeeze rolls, by applying suction, or by blowing with air. The amount of polymer deposited in the leather will be determined by the polymer content of the emulsion and the amount of emulsion retained.

It is preferable to treat the leather at room temperature, i.e., 20° to 30° C. Temperatures as high as 60° to 65° C. may prevail. At temperatures above 70° C. the leather may be damaged. The degree of impregnation to be attained will depend upon the end use of the leather. Total impregnation, such as would be obtained by drumming the leather in the presence of a large quantity of the emulsion of polyurethane polymer, should be avoided because it leads to a boardy product. In general, the leather should be impregnated with an amount of from about 1.0 to 10.0 grams of polyurethane polymer per square foot of leather.

After the leather has been partially impregnated, the water and solvent are removed by any of several procedures. For example, the leather may be air-dried for about a day at room temperature or it may be hung on a conveyor belt and passed through a warm or hot air oven at temperatures up to about 65° C. The impregnated leather is then kept in air at room temperature and with about 50 percent relative humidity for 5 to 10 days in order to cure the polyurethane polymer, i.e., convert the initially viscous liquid polymeric material into a firm, solid substance. Other conditions of temperature, humidity, and time may, of course, be employed; higher temperatures and greater relative humidity will accelerate the cure. It will be found that appreciable curing occurs during the drying operation.

As will be noted from the following examples, the process of this invention greatly improves the physical properties of paper, particularly its dry and wet tensile strength and ply adhesion and greatly enhances the physical properties of leather. The process is convenient to operate and is believed to represent a distinct advance in the art.

The following examples will better illustrate the nature of the present invention; however, the invention is not intended to be limited to these examples. Parts are by weight unless otherwise indicated.

In the examples, the following test procedures are employed.

I. For paper:
(a) The tensile strength of the dry impregnated paper was determined by TAPPI Method T404M–50.
(b) The tensile strength of the wet impregnated paper was determined by TAPPI Method T456M–49.
(c) The ply adhesion (also called the strip adhesion) was determined by the test method described on page 677 of Tappi, vol. 40, No. 8, August 1957.
(d) Mullen bursting strength was determined using TAPPI Official Standard T403M–53.
(e) Internal bond test: For this test a cement is made by milling 1.25 parts of Type AC neoprene for 10 minutes and subsequently agitating the milled stock at room temperature for 16 hours with 1.25 parts of "Durez" resin 12603 and 5.5 parts of toluene.

In the test brass blocks are used having a diameter of 1.13 inches and a thickness of ¼ inch; projecting from the upper surface of the block is a cylinder $\frac{11}{32}$ inch in diameter and $\frac{7}{16}$ inch high; through the side of the cylinder is a hole $\frac{5}{32}$ inch in diameter having its center ¼ above the upper surface of the block. The flat surface of each block is brushed with the cement. Each block is then placed in a 70° C. oven for 15 minutes and finally in a 100° C. oven for 15 minutes. Two blocks are removed from the oven and placed in the upper and lower platen holders of an air press. A paper specimen 1.5″ x 1.5″ is placed on the flat surface of the lower block and 24 lbs./sq. in. pressure is applied for 10±0.5 seconds to force the flat surfaces of the blocks together. The press is opened and the pair of blocks having the paper adhered between them is placed in a chamber at 75±2° F. for at least one hour.

Adapter rods are placed in a Tinius Olsen testing machine. The projections of the brass blocks are set in the cylindrical recesses on the ends of the adapter rods and ⅛″ diameter steel pins are slipped through the holds in the adapters and the projections. The testing machine is used at the 1000-lb. full scale setting; the load is applied at the rate of one inch/min. The maximum value on the dial of the testing machine is recorded as the internal bond strength in lb./sq. in.

II. For leather: The physical properties of leather and the improvements brought about by the application of a polyurethane or other finishes are much more subjective in nature than the improvements obtainable on paper. This subjectivity results from the non-uniformity of the substrate material; the animal hides which are made into leather are non-uniform. The method of tannage employed causes still further variations. Nonetheless, the pronounced improvement in scuff resistance imparted to the leather by the polyurethane applied in emulsion form is readily demonstrated. For example, when a piece of leather that has been treated with an emulsion of a polyurethane and been allowed to dry and cure is rubbed under high hand pressure with the edge of a coin or similar piece of metal, the leather fibers undergo little or no rupturing. A similar piece of untreated leather, when subjected to this test, readily ruptures and plainly shows the well-known scuff effect.

The "break" properties of leather are even more subjective. In this test, the leather is bent with the grain side on the concave side of the bend, and the tendency of the leather to form small wrinkles is observed.

The following emulsifying agents were used:

Emulsifier A (non-ionic surface active agent): A nonylphenylmonoether of polyethyleneether glycol; its number-average molecular weight is about 340.

Emulsifier B (anionic surface active agent): A disodium salt of a bis(isopropyl naphthyl)methane disulfonic acid.

Emulsifier C (non-ionic surface active agent): A nonylphenylmonoether of polyethyleneether glycol, its number-average molecular weight is about 500. This agent is available as "Igepal CO–530."

Emulsifier D (anionic surface active agent): A sodium salt of sulfated mixed $C_{12}$, $C_{14}$ and $C_{16}$ alcohols. This agent is available as "Aquarex ME."

In the examples which follow the percent pickup was varied by diluting a standard emulsion with water in accordance with principles familiar to those skilled in the art. One may prepare a working curve of percent pickup vs. percent solids, or, less accurately, one may measure the percent pickup for paper immersed in an emulsion of known strength and calculate the emulsion strength needed for other percent pickup values by simple proportions.

EXAMPLE 1

A. Preparation of polyurethane Polymer A 278.7 parts of toluene-2,4-diisocyanate and 1000 parts of anhydrous polytetramethyleneether glycol having a molecular weight of 1000 are agitated at 80° C. for 4 hours in a dry reaction vessel protected from atmospheric moisture. Polyurethane Polymer A thus obtained has a free isocyanate content of 4.2%, a Brookfield viscosity at 30° C. of about 16,500 cps., and a number-average molecular weight of about 2000.

B. *Preparation of emulsions*

(1) A solution consisting of 75 parts of Polyurethane Polymer A, 25 parts of toluene, and 6 parts of Emulsifier A was heated to 90–95° C. and added to a solution of 0.5 part of Emulsifier B in 144.5 parts of water at about 85° C. agitated by an Eppenbach "Homomixer." Emulsion B–1 thus obtained contained 30 percent Polyurethane Polymer A by weight.

(2) Emulsion B–2, containing 25 percent Polyurethane Polymer A by weight, and Emulsion B–3, containing 20 percent Polyurethane Polymer A by weight, were obtained by adding 50 and 125 parts of water, respectively, to 250 parts of Emulsion B–1.

(3) Emulsions B–1, B–2, and B–3 were allowed to stand for no longer than 6 hours at 25° C. before they were used in the procedures of Part C below.

C. *Paper treatment*

(1) Sheets of blotting paper were immersed in Emulsion B–1 at room temperature for about 10 seconds. They were then withdrawn and placed between sheets of absorbent paper for about 10 seconds to remove the excess emulsion. The saturated blotting paper thus obtained was cured at 25° C. at 50% relative humidity for 48 hours.

(2) Sheets of blotting paper were saturated with Emulsion B–2 by the procedure of Part C–1 above.

(3) Sheets of blotting paper were saturated with Emulsion B–3 by the procedure of Part C–1 above.

D. *Testing of the saturated paper*

An untreated control and the cured sheets of saturated blotting paper obtained by the procedure of Part C above were tested for gain in weight (percent pickup), wet and dry tensile breaking strength, Mullen burst and internal bond. The results obtained are given below in Table I.

TABLE I

|  | Saturated Paper B-1 | Saturated Paper B-2 | Saturated Paper B-3 | Control |
|---|---|---|---|---|
| Pickup (percent) | 40 | 20 | 19.5 | 0 |
| Dry: |  |  |  |  |
| $T_B$ (lb./in.²) | 1,350 | 850 | 766 | 270 |
| $E_B$ (percent) | 9.4 | 11.1 | 10.9 | 4.2 |
| Wet:[1] |  |  |  |  |
| $T_B$ (lb./in.²) | 742 | 338 | 280 | 25.6 |
| $E_B$ (percent) | 18.3 | 23.6 | 28.5 | 9.6 |
| Mullen Burst (points) | 90 | 92 | 73 | 29 |
| Internal Bond (lb./sq. in.) | 20.0 | 38.8 | 20.0 | 6.3 |

[1] Papers immersed in water at 25° C. for 42 hours before testing.

EXAMPLE 2

30 gauge blotter paper was immersed for about 10 seconds at room temperature in Emulsion B–1 (made according to the procedure of Part B of Example 1 and allowed to stand less than 1 hour at room temperature). It was then withdrawn and placed between sheets of absorbent paper for about 10 seconds to remove the excess emulsion. The saturated blotting paper thus obtained was cured at room temperature and 50% relative humidity for 12 hours. The cured tack-free paper obtained, which weighed 48 percent more than the untreated paper, was immersed for about 10 seconds at room temperature in Emulsion B–1 (about 1 hour old), withdrawn, placed between sheets of absorbent paper for about 10 seconds, and cured at 25° C. and 50% relative humidity for 48 hours. The cured saturated blotting paper thus obtained was much better than an untreated control with respect to dry and wet tensile strength, Mullen burst strength, and the internal bond. The results are given below in Table II.

TABLE II

|  | Saturated Paper | Control |
|---|---|---|
| Pickup (percent) | 110 to 120 | 0 |
| Dry: |  |  |
| $T_B$ (lbs./in.²) | 2,630 | 510 |
| $E_B$ (percent) | 12.5 | 2.5 |
| Wet:[1] |  |  |
| $T_B$ (lbs./in.²) | 1,964 | 44.5 |
| $E_B$ (percent) | 19.6 | 3.6 |
| Mullen Burst (points) | 228 | 27.9 |
| Internal Bond (lb./sq. in.) | 60.1 | 0.5 |

[1] Paper immersed in water at 25° C. for 24 hrs. before testing.

EXAMPLE 3

A. *Preparation of emulsion*

A solution consisting of 100 parts of Polyurethane Polymer A, 50 parts of toluene and 4 parts of Emulsifier C was added at room temperature to a solution at room temperature of 30 parts of a 10% aqueous solution of Emulsifier D, 20 parts of a 5% aqueous sodium dioctyl sulfosuccinate, 30 parts of 10% aqueous ammonium caseinate, and 66 parts of water agitated by an Eppenbach "Homomixer." The emulsion thereby obtained had 33.3 percent by weight Polyurethane Polymer A. It was not allowed to stand more than 6 hours before being used. It was diluted with various amounts of water (minimum solids content about 15%) in order that the percent pickup range between about 55 and 105%.

B. *Treatment of masking tape base*

Sheets of masking tape base 6½" x 8" x 0.006" were immersed for about 10 seconds at room temperature in the diluted emulsions prepared in Part A above. The sheets were withdrawn and excess emulsion was removed by passing them through the 6 mil bite of a pair of squeeze rolls. They were then placed in a 100° C. oven for 10 minutes. Samples 3B–1, 3B–2, and 3B–3 of the dry sheets thereby obtained were aged at 25° C. and 50% relative humidity for 1, 4 and 7 days, respectively. Tables III, IV and V which follow show the effect of saturation on the wet and dry tensile strength of the aged papers 3B–1, 3B–2 and 3B–3, respectively.

TABLE III
(3B–1)

|  | Control |  |  |  |  |  |
|---|---|---|---|---|---|---|
| Pickup (percent) | 0 | 61 | 70 | 78 | 90 | 98 |
| Dry: |  |  |  |  |  |  |
| $T_B$ (lb./in. of width) | 11 | 11.2 | 13.5 | 19 | 16.4 | 16.7 |
| $E_B$ (percent) | 15 | 18.2 | 18.6 | 20.6 | 19.6 | 20.4 |
| Wet:[1] |  |  |  |  |  |  |
| $T_B$ (lb./in. of width) | 0.5 | 15.1 | 16 | 17.6 | 18.3 | 18.1 |
| $E_B$ (percent) | 12.5 | 23.4 | 24.6 | 23.5 | 23.8 | 23.8 |

[1] Paper immersed in water at 25° C. for 24 hrs. before testing.

TABLE IV
(3B–2)

|  |  |  |  |  |  |
|---|---|---|---|---|---|
| Pickup (percent) | 62 | 70 | 83 | 88 | 102 |
| Dry: |  |  |  |  |  |
| $T_B$ (lb./in. of width) | 23.6 | 23.8 | 24.3 | 24.7 | 24.5 |
| $E_B$ (percent) | 22.3 | 20.8 | 20.4 | 20.8 | 19.6 |
| Wet:[1] |  |  |  |  |  |
| $T_B$ (lb./in. of width) | 16 | 18.9 | 19 | 17.5 | 21.2 |
| $E_B$ (percent) | 24.4 | 25 | 23.5 | 23.4 | 24.4 |

[1] Paper immersed in water at 25° C. for 24 hrs. before testing.

TABLE V
(3B–3)

|  |  |  |  |  |  |
|---|---|---|---|---|---|
| Pickup (percent) | 57 | 70 | 78 | 88 | 101 |
| Dry: |  |  |  |  |  |
| $T_B$ (lb./in. of width) | 23.7 | 24.6 | 24.1 | 23.3 | 22.3 |
| $E_B$ (percent) | 21.3 | 20.6 | 21.7 | 21.5 | 21.3 |
| Wet:[1] |  |  |  |  |  |
| $T_B$ (lb./in. of width) | 16.4 | 15.8 | 17.4 | 17.2 | 17.3 |
| $E_B$ (percent) | 24.7 | 24.8 | 26 | 25.9 | 25.8 |

[1] Paper immersed in water at 25° C. for 24 hrs. before testing.

Tables VI, VII and VIII, which follow, show the effect of saturation on the ply adhesion of the aged papers 3B-1, 3B-2 and 3B-3, respectively.

TABLE VI
(3B-1)

|  | Control |  |  |  |  |  |
|---|---|---|---|---|---|---|
| Pickup (percent) | 0 | 63 | 69 | 78 | 93 | 101 |
| Ply Adhesion (oz./in.) | 7.0 | 9.2 | 7.6 | [1]62 | [1]65.6 | [1]62.6 |

[1] Values for saturated paper are adhesive failure of testing assembly.

TABLE VII
(3B-2)

|  | Control |  |  |  |  |  |
|---|---|---|---|---|---|---|
| Pickup (percent) | 0 | 61 | 72 | 82 | 90 | 101 |
| Ply Adhesion (oz./inch) | 7.0 | [1]99 | [1]109 | [1]109 | [1]109 | [1]109 |

[1] Values for saturated paper are adhesive failure of testing assembly.

TABLE VIII
(3B-3)

| Pickup (percent) | 0 | 63 | 72 | 79 | 87 | 98 |
|---|---|---|---|---|---|---|
| Ply Adhesion (oz./inch) | 7.0 | [1]116 | [1]111 | [1]104 | [1]114 | [1]118 |

[1] Values for saturated paper are adhesive failure of testing assembly. Saturated paper did not tear.

EXAMPLE 4

A. Preparation of emulsion 100 parts of Polyurethane Polymer A was heated to about 70° C.; after 4 parts of Emulsifier C had been introduced, the mixture obtained was added to a solution at room temperature of 116 parts of water, 30 parts of a 10% aqueous solution of Emulsifier D, 20 parts of 5% aqueous sodium dioctyl sulfosuccinate, and 30 parts of 10% aqueous ammonium caseinate while agitation was provided by an Eppenbach "Homomixer." The emulsion obtained was subsequently agitated for 30 minutes with the "Homomixer" and passed 4 times through a colloidal mill having a setting of 0.003". It was then diluted to about 20% solids to insure a percent pickup of about 50%.

B. Treatment of masking tape base

When the emulsion had been prepared, sheets of masking tape 6½" x 8" x 0.006" were introduced for about 10 seconds at room temperature. The sheets were then withdrawn and excess emulsion was removed by passing them between a pair of squeeze rolls having a bite of 6 mils. They were subsequently put in a 100° C. oven for 10 minutes. The dry sheets thereby obtained were aged at 25° C. and 50% relative humidity for 1 day. Table IX, which follows, shows the values obtained for the properties measured.

TABLE IX

| Pickup (percent) | Dry $T_B$ (lb./in.) | Dry $E_B$ (percent) | Wet [1] $T_B$ (lb./in.) | Wet [1] $E_B$ (percent) | Ply Adhesion (oz./in.) |
|---|---|---|---|---|---|
| 50 | 23 | 24 | 6.6 | 21 | 36 |
| 0 | 11 | 15 | 0.5 | 12.5 | 7.2 |

[1] Dried treated paper immersed in water at 25° C. for 22 hours before testing.

EXAMPLE 5

A. Preparation of Polyurethane Polymer B 348.4 parts of toluene-2,4-diisocyanate and 1000 parts of anhydrous polytetramethyleneether glycol having a molecular weight of 1000 are agitated at 80° C. for 4 hours in a dry reaction vessel protected from atmospheric moisture. Polyurethane Polymer B thus obtained has a free isocyanate content of 6.4% and a Brookfield viscosity at 30° C. of 6000 to 7000 cps.

B. Treatment of masking tape base

The general procedures of Parts A and B of Example 3 above were repeated except that: (1) Polyurethane Polymer B was substituted for Polyurethane Polymer A; (2) the dry treated sheets were aged for 5 days; (3) the minimum solids content was about 5% instead of about 15%. Tables X and XI, which follow, show the values obtained for the measured properties.

TABLE X

| Pickup (percent) | 10 | 20 | 30 | 40 | 50 |
|---|---|---|---|---|---|
| Dry: |  |  |  |  |  |
| $T_B$ (lb./in. of width) | 14.5 | 20 | 20.6 | 24.5 | 23.1 |
| $E_B$ (percent) | 18.8 | 21.7 | 21 | 20 | 18.4 |
| Wet:[1] |  |  |  |  |  |
| $T_B$ (lb./in. of width) | 5.7 | 9.3 | 13.1 | 16.6 | 17.7 |
| $E_B$ (percent) | 20.2 | 22.3 | 24.4 | 24.6 | 24.2 |

[1] Dry treated paper immersed in water at 25° C. for 24 hours before testing.

TABLE XI

| Pickup (percent) | 11 | 20 | 30 | 41 | 48 |
|---|---|---|---|---|---|
| Ply Adhesion (oz./in. of width) | 12 | 18.4 | 27.5 | 42 | 42.7 |

EXAMPLE 6

A. Preparation of emulsion

Polyurethane Polymer A was capped by reaction with 2 moles of n-butylamine; its free isocyanate content was then essentially zero.

4 parts of Emulsifier C was added to a solution of 100 parts of the capped Polyurethane Polymer A and 200 parts of toluene at 70° C. The mixture obtained was slowly added to an aqueous solution at room temperature of 30 parts of a 10% aqueous solution of Emulsifier D, 20 parts of 5% sodium dioctyl sulfosuccinate, 30 parts of 10% ammonium caseinate, and 109 parts of water; during the addition and for about 15 minutes thereafter vigorous agitation was provided by an Eppenbach "Homomixer." The emulsion was then diluted with various amounts of water (minimum solids content about 5%) in order that the percent pickup range between 0 and 50%.

B. Treatment of masking tape base

Less than 6 hours after the diluted emulsion had been prepared by the procedure of Part A above, strips of masking tape base were saturated according to the general procedure of Part B of Example 3. Immersion times ranged between 5 and 20 seconds, and pickup values ranged between 0 (control) and 50%. The dried paper was then aged for 7 days at 25° C. and 50% relative humidity. With respect to wet and dry tensile and ply adhesion, there was no significant difference between the control (not treated with latex) and any of the latex treated papers.

EXAMPLE 7

A. Preparation of Polyurethane Polymer C

A mixture consisting of 348.4 parts of toluene-2,4-diisocyanate, 45 parts of 1,3-butanediol, and 500 parts of anhydrous polytetramethyleneether glycol having a molecular weight of 1000 is agitated at 80° C. for 4 hours under a protective nitrogen atmosphere in a dry reaction vessel. Polyurethane Polymer C thereby obtained has a free isocyanate content of 9.4% and a Brookfield viscosity at 30° C. of about 14,000 cps.

B. *Preparation of emulsion*

4 parts of Emulsifier C was added to a solution of 100 parts of Polyurethane Polymer C and 50 parts of toluene at room temperature. The mixture obtained was added to a solution at room temperature consisting of 30 parts of a 10% aqueous solution of an anionic surface active agent consisting of Emulsifier D, 20 parts of 5% sodium dioctyl sulfosuccinate solution, 30 parts of 10% ammonium caseinate, and 66 parts of water at room temperature; during the addition and for about 15 minutes thereafter vigorous agitation was provided by an Eppenbach "Homomixer." The emulsion was then diluted with various amounts of water in order that percent pickup range between about 0 and 80%; the minimum solids content was about 5%.

C. *Treatment of masking tape base*

Diluted emulsions, freshly prepared according to the procedure of Part B above, were used to saturate strips of masking tape base according to the general procedure of Part B of Example 3. Immersion ranged between 5 and 20 seconds and the resulting gain in weight of the dried paper varied from 8% to 80%. After the strips had been aged one day at 25° C. and 50% relative humidity, the dry and wet tensile strength and the ply adhesion were measured. Tables XII and XIII below give the values obtained.

TABLE XII

| Pickup (percent) | 0 | 8 | 23 | 28 | 38 | 47 | 77 |
|---|---|---|---|---|---|---|---|
| Dry: | | | | | | | |
| $T_B$ (lb./in. of width) | 8.8 | 16.2 | 21.4 | 22 | 23 | 23.7 | 25 |
| $E_B$ (percent) | 14.5 | 20.8 | 23.4 | 22.9 | 22.9 | 25 | 23.8 |
| Wet:[1] | | | | | | | |
| $T_B$ (lb./in. of width) | 0.5 | 5.5 | 9.5 | 8.5 | 10.6 | 10 | 14.6 |
| $E_B$ (percent) | 13.3 | 20.6 | 23.1 | 22.3 | 24 | 22.3 | 25.8 |

[1] Paper immersed in water at 25° C. for 24 hrs. before testing.

TABLE XIII

| Pickup (percent) | 0 | 10 | 21 | 28 | 40 | 47 | 80 |
|---|---|---|---|---|---|---|---|
| Ply Adhesion (oz./in. of width) | 6.9 | 16 | 27 | 32.3 | 44.5 | 42.9 | [1] 104 |

[1] Adhesive failure of test assembly. Paper failure did not occur.

EXAMPLE 8

A. *Preparation of the emulsion*

Polyurethane Polymer A was emulsified by a procedure similar to that described in Part A of Example 3 above.

B. *Treatment of masking tape base*

(1) *Use of fresh emulsion.*—Sheets of masking tape base 6½" x 8" x 0.006" were introduced into the freshly prepared diluted emulsion (about 5% solids) at room temperature for periods ranging from 5 to 20 seconds. The sheets were withdrawn and excess emulsion was removed by passing them between a pair of squeeze rolls having a bite of about 0.006". They were subsequently placed in a 100° C. oven for 10 minutes. The dry sheets thus prepared were aged at room temperature and 50% relative humidity for 7 days before testing.

(2) *Use of aged emulsions.*—The emulsion prepared in Part A above was allowed to stand at 25° C. for 2 weeks. At intervals during this period samples of this aging latex diluted to about 5% solids content were used to saturate masking tape base by the procedure of Part B-1 above. All the dried sheets were aged at 25° C. and 50% relative humidity for 7 days before testing.

(3) *Test results.*—The data obtained, which are given in Tables XIV and XV below, show that after a latex has aged for one day, it loses much of its effectiveness in improving the tensile strength of wet paper.

TABLE XIV

| Latex Aging Time (days) | Saturated Paper | | | | | Control |
|---|---|---|---|---|---|---|
| | 0 | 1 | 2 | 7 | 14 | |
| Dry: | | | | | | |
| $T_B$ (lb./in. of width) | 20.7 | 15.3 | 13.5 | 12.8 | 11.7 | 10 |
| $E_B$ (percent) | 20.9 | | 21 | 19.4 | 18.8 | 15 |
| Wet:[1] | | | | | | |
| $T_B$ (lb./in. of width) | 11.5 | 1.4 | 1.0 | 0.8 | 0.8 | 0.5 |
| $E_B$ (percent) | 24.1 | 16.9 | 14 | 12.5 | 13.4 | 12.5 |
| Pickup (percent) | 7 | 9 | 10 | 10 | 10 | 0 |

[1] Paper immersed in water at 25°C. for 24 hours before testing.

TABLE XV

| Latex Aging Time (days) | Saturated Paper | | | | | Control |
|---|---|---|---|---|---|---|
| | 0 | 1 | 2 | 7 | 14 | |
| Ply Adhesion (oz./in. of width) | 21.9 | 14.1 | 14.7 | 15.5 | 13.6 | 6.5–7.2 |
| Pickup (percent) | 12 | 12 | 10 | 13 | 12 | 0 |

EXAMPLE 9

A. Unbleached kraft pulp was beaten to a Canadian "freeness" of 450 cc. An emulsion containing 33.3 percent by weight Polyurethane Polymer A was prepared according to the procedure of Part A of Example 3 above. Thirty parts of this emulsion was added within 6 hours of its preparation to the beaten pulp (100 parts pulp on a dry basis) in the beater; the "consistency" (percent solids by weight) was 2.5 and the pH was 7.5. After the mixture had been circulated in the beater for several minutes at about 20 to 25° C. a 5% aqueous solution of aluminum sulfate octadecahydrate ("alum") was introduced. The pH of the mixture dropped to 4.5. Sheets of paper were then formed in an 8 x 8" Noble-Wood mold. The dry basis weight was 60 lbs./3000 sq. ft. The paper was pressed between blotter sheets and dried on a drum drier at 140.5° C. (285° F.) for 8 minutes. It was finally aged at 25° C. and 50% relative humidity for 24 hours.

B. The process of Part A above was repeated except that 75 parts of the emulsion was added.

C. A control run was carried out by omitting the use of the emulsion in the procedure of Part A above.

D. Sheets A–C made according to the procedures of Parts A–C above, respectively, were tested while dry and after soaking for 24 hours at about 25° C. in distilled water. The table, which follows, shows that the wet strength of the paper was materially improved by the application of the polyurethane latex. In the 20% lactic acid size test (TAPPI Method T466–M52) the treated paper also showed much improvement over the control.

| Paper | Control | A | B |
|---|---|---|---|
| 20% Lactic Acid (sec.) | 4 | 14 | 23 |
| Wet Internal Bond Strength (Percent of Dry) | 3 | 60 | 60 |
| Wet Mullin Burst (Percent of Dry) | 35 | 65 | 70 |
| Wet Tensile Strength (Percent of Dry) | 1 | 22 | 30 |

10 parts Polyurethane Polymer A/100 parts dry pulp
25 parts Polyurethane Polymer A/100 parts dry pulp

EXAMPLE 10

A. *Preparation of emulsion*

To a solution consisting of 10 parts of Polyurethane Polymer A and 10 parts of an aromatic solvent composed essentially of alkylated benzenes boiling in range 318–329° F. was added 0.5 part of the sodium salt of an alkanesulfonic acid having about 20 carbon atoms in the chain as a 7% water solution. After thorough mixing, the mixture was subjected to high shear agitation, and 16.5 parts of water was slowly added. As the water addition continued the emulsion mass became very viscous and then suddenly inverted to provide a stable, finely divided dispersion of the polymer-solvent solution in water containing 23% by weight of polymer.

B. *Treatment of leather*

Sections of tanned cowhide were swabbed on the grain surface with the emulsion prepared in Part A above to apply from 2 grams to 6 grams of the polymer per square foot of the leather. This was done within two hours after preparing the emulsion. The emulsion rapidly penetrated the leather. The treated leather was air-dried overnight at room temperature and then stored for one week in air at room temperature and with about 50% relative humidity. The resultant leather sections exhibited scuff resistance, that is, the surface of the leather rubbed vigorously with the edge of a coin, resisted tearing of the surface fibers whereas the same, but untreated, leather was readily scuffed under similar abrasive action of the metal edge.

The same polyurethane solution of Part A above was similarly emulsified employing as emulsifying agent 0.5 part of polyvinyl alcohol and 0.15 part of a condensation product of hexadecanol and ethylene oxide. The resultant emulsion was diluted with water to provide an emulsion that contained 16% by weight of polyurethane. Within four hours after the emulsion was prepared it was brushed on the grain surface of tanned cowhide to impregnate partially the leather with about 4 grams per square foot of the polyurethane. After the leather was dried and cured as described above, it exhibited a markedly higher scuff resistance than the untreated leather.

Emulsions were also made with 0.35 part of sodium dodecyl sulfate, 0.35 part of sodium octylbenzene sulfonate, and 0.53 part of isooctylphenol-ethylene oxide condensation product, respectively, in place of the 0.5 part of the sodium alkanesulfonate employed above and found to impart both scuff resistance and an improved "break," i.e., definitely decreased the wrinkling of the leather after bending, when applied to tanned cowhide as described.

EXAMPLE 11

An emulsion was prepared as in Example 10 using Polyurethane Polymer B of Example 5 in place of Polyurethane Polymer A. When applied to the grain surface of tanned cowhide in an amount of about 2 grams of the polyurethane per square foot of the leather within an hour after the emulsion was prepared, the emulsion imparted decidedly improved scuff resistance. It was noted that this polymer tends to give a somewhat stiffer leather than Polyurethane Polymer A.

Similarly, an emulsion likewise prepared with Polyurethane Polymer C of Example 7 possesses good wetting and penetrating action for leather and imparts to the leather good scuff resistance with a stiffening effect compared with Polymer A.

EXAMPLE 12

A. *Preparation of Polyurethane Polymer D*

79 parts of toluene-2,4-diisocyanate and 300 parts of anhydrous polypropylene glycol having a molecular weight of 1000 are agitated at 100° C. for 4 hours in a dry reaction vessel protected from atmospheric moisture. Polyurethane Polymer D thus obtained has a free isocyanate content of 3.3%.

B. *Preparation of emulsion*

10 parts of the Polyurethane Polymer D was dissolved in 10 parts of mixed xylenes and 0.3 part of sodium alkanesulfonate (the alkane chain having about 20 carbon atoms) was added. With high speed agitation 18 parts of water was slowly added. A stable, finely-divided dispersion which contained 26% of Polyurethane Polymer D was formed.

C. *Treatment of leather*

Tanned cowhide was swabbed on its grain side with the above emulsion to impregnate partially the leather with about 4 grams of Polyurethane Polymer D per square foot of the leather immediately after preparing the emulsion. Ready wetting and penetration of the leather by the emulsion occurred. When the leather was dried and "cured" for one week, it exhibited high scuff resistance.

It is to be understood that the above-described emulsions can be used advantageously to treat substrates other than paper or leather. Since these emulsion are promising adhesives, they may be used broadly to treat porous substrates which thereafter acquire enhanced strength from the binding action of the polyurethane polymer deposited thereon. The emulsion may be used to saturate the interstices of a substrate or it may be applied as a coating to its outer surface. The examples have illustrated the saturation of cellulose fibers in the form of chemically processed pulp (called "furnish") and in the form of sheet paper and the partial impregnation of leather. It is also possible to coat the surface of porous paper to seal it for application of surface finishes and adhesion to other substrates. Leather "dust" can be bound together by applying the above-described emulsions. Representative examples of other substrates which can be treated include: asbestos sheet; non-woven fabrics; textiles. Cotton, glass fibers, rayon, wool, polyacrylonitrile and polyester fibers are useful materials for preparing these fabrics and textiles.

This application is a continuation-in-part of our copending application Serial No. 2586, filed January 15, 1960, and now abandoned.

As many widely different embodiments of this invention may be made without departing from the spirit and scope thereof, it is to be understood that this invention is not limited to the specific embodiments thereof except as defined in the appended claims.

What is claimed is:

1. A process for treating unsized paper which comprises contacting the paper with an aqueous emulsion containing a polyurethane polymer so as to impregnate said paper with from about 5 to about 150 percent of its weight with said polyurethane polymer, drying said impregnated paper, and curing said polyurethane polymer; said aqueous emulsion being prepared by emulsifying a fluid isocyanate-terminated polyurethane polymer in an aqueous medium at temperatures between 20° and 95° C. with agitation in the presence of a water-soluble organic emulsifying agent of the type which will give an oil-in-water emulsion; said emulsion being applied to the paper at temperatures between 20° and 95° C. within 24 hours of its preparation; said isocyanate-terminated polyurethane polymer being the reaction product of (1) a molar excess of an aromatic polyisocyanate and (2) an organic polyol selected from the group consisting of at least one hydroxyl-terminated organic polymer having a molecular weight between about 750 and about 4000 and mixtures of said organic polymer with up to about 20 percent by weight of said polymer of at least one aliphatic polyol having a molecular weight between 62 and about 350, said aliphatic polyol having $n$ hydroxyl groups, wherein $n$ is an integer having a value of at least 2 with $n-2$ of said hydroxyl groups being cross-linking hydroxyl groups; the relative proportions of said aromatic polyisocyanate and said organic polyol being selected so that the ratio of the number of free isocyanate groups to the total number of hydroxyl groups has a value ranging between about 1.2 and about 2.0; there being an average of no more than about one cross-linking hydroxyl group for each 1200 molecular weight units of said isocyanate-terminated polyurethane polymer; said organic polymer being selected from the group consisting of polyalkyleneether glycols, polyalkyleneether-aryleneether glycols, polyalkyleneether-thioether glycols, polyalkylenearyleneether-thioether glycols, polyester polyols, fatty acid triglycerides having a hydroxyl number of at least 49, and reaction products of alkylene oxides with hydrocarbon polyols, said alkylene oxides having molecular weights between about 44 and about 250, said hydrocarbon polyols having molecular weights about 62 and 350.

2. The process of claim 1 wherein the aqueous emulsion is prepared and applied to the paper at a temperature of between 20° and 35° C. within 8 hours of its preparation.

3. The process of claim 2 wherein the isocyanate-terminated polyurethane polymer is prepared from toluene-2,4-diisocyanate and a polyalkyleneether glycol.

4. The process of claim 3 wherein the polyalkyleneether glycol is a polytetramethyleneether glycol.

5. The process of claim 3 wherein the polyalkyleneether glycol is a polypropyleneether glycol.

6. The process of claim 2 wherein the isocyanate-terminated polyurethane polymer is prepared from toluene-2,4-diisocyanate, a polytetramethyleneether glycol and 1,3-butanediol.

7. A process for treating leather which comprises contacting one side of the leather with an aqueous emulsion containing a polyurethane polymer so as to partially impregnate said leather with from about 1.0 to 10.0 grams of said polyurethane polymer per square foot of said leather, drying said impregnated leather and curing said polyurethane polymer, said aqueous emulsion being prepared by emulsifying a fluid isocyanate-terminated polyurethane polymer in an aqueous medium at temperatures between 20° and 95° C. with agitation in the presence of a water-soluble organic emulsifying agent of the type which will give an oil-in-water emulsion; said emulsion being applied to the leather at temperatures between 20° and 70° C. within 24 hours of its preparation; said isocyanate-terminated polyurethane polymer being the reaction product of (1) a molar excess of an aromatic polyisocyanate and (2) an organic polyol selected from the group consisting of at least one hydroxyl-terminated organic polymer having a molecular weight between about 750 and about 4000 and mixtures of said organic polymer with up to about 20 percent by weight of said polymer of at least one aliphatic polyol having a molecular weight between 62 and about 350, said aliphatic polyol having $n$ hydroxyl groups, wherein $n$ is an integer having a value of at least 2 with $n-2$ of said hydroxyl groups being cross-linking hydroxyl groups; the relative proportions of said aromatic polyisocyanate and said organic polyol being selected so that the ratio of the number of free isocyanate groups to the total number of hydroxyl groups has a value ranging between about 1.2 and about 2.0; there being an average of no more than about one cross-linking hydroxyl group for each 1200 molecular weight units of said isocyanate-terminated polyurethane polymer; said organic polymer being selected from the group consisting of polyalkyleneether glycols, polyalkyleneether-aryleneether glycols, polyalkyleneether-thioether glycols, polyalkylene-aryleneether-thioether glycols, polyester polyols, fatty acid triglycerides having a hydroxyl number of at least 49, and reaction products of alkylene oxides with hydrocarbon polyols, said alkylene oxides having molecular weights between about 44 and about 250, said hydrocarbon polyols having molecular weights between about 62 and about 350.

8. The process of claim 7 wherein the aqueous emulsion is prepared and applied to the leather at a temperature of between 20° and 30° C. within 8 hours of its preparation.

9. The process of claim 8 wherein the isocyanate-terminated polyurethane polymer is prepared from toluene-2,4-diisocyanate and a polyalkyleneether glycol.

10. The process of claim 9 wherein the polyalkyleneether glycol is a polytetramethyleneether glycol.

11. The process of claim 9 wherein the polyalkyleneether glycol is a polypropyleneether glycol.

12. The process of claim 8 wherein the isocyanate-terminated polyurethane polymer is prepared from toluene-2,4-diisocyanate, a polytetramethyleneether glycol and 1,3-butanediol.

References Cited by the Examiner

UNITED STATES PATENTS

| 2,929,800 | 3/60 | Hill | 260—77.5 |
| 2,968,575 | 1/61 | Mallonee | 260—29.2 |

FOREIGN PATENTS

| 583,572 | 9/59 | Canada. |

RICHARD D. NEVIUS, Primary Examiner.